(12) United States Patent
Smith et al.

(10) Patent No.: US 6,389,214 B1
(45) Date of Patent: May 14, 2002

(54) FURCATION APPARATUS FOR OPTICAL FIBERS

(75) Inventors: Duane T. Smith, Round Rock; Ching-Long Tsai, Austin; Robert T. Smith; Kirk A. Halliburton, both of Round Rock, all of TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/860,014

(22) Filed: May 17, 2001

(51) Int. Cl.[7] .................................................. G02B 6/00
(52) U.S. Cl. ............................................. 385/136; 385/86
(58) Field of Search .................................. 385/134, 135, 385/136, 137, 86, 87; 439/460

(56) References Cited

U.S. PATENT DOCUMENTS

| | | | | |
|---|---|---|---|---|
| 4,795,230 A | * | 1/1989 | Garcia et al. | 242/128 |
| 5,231,688 A | | 7/1993 | Zimmer | 385/139 |
| 5,381,501 A | * | 1/1995 | Cardinal et al. | 385/134 |
| 5,473,718 A | | 12/1995 | Sommer | 385/87 |
| 5,561,731 A | | 10/1996 | Cooke et al. | 385/114 |
| 5,644,673 A | * | 7/1997 | Patterson | 385/138 |
| 5,838,861 A | | 11/1998 | Bunde | 385/100 |
| 5,903,693 A | | 5/1999 | Brown | 385/100 |
| 5,915,055 A | | 6/1999 | Bennett et al. | 385/59 |
| 5,966,489 A | | 10/1999 | Harwell et al. | 385/114 |
| 6,072,932 A | | 6/2000 | Bennett et al. | 385/139 |
| 6,104,855 A | | 8/2000 | Jeon | 385/139 |

FOREIGN PATENT DOCUMENTS

EP          0 889 344 A1     1/1999

* cited by examiner

Primary Examiner—Brian Sircus
Assistant Examiner—Michael C. Zarroli
(74) Attorney, Agent, or Firm—Yen Tong Florczak (57) ABSTRACT

A furcation apparatus for a multi-conductor cable of the type having reinforcing fibers for longitudinal strength. The furcation apparatus includes a furcation spacer having a plurality of passages extending through an interior of the furcation spacer from a first end to a second end. Each passage is of a size sufficient to receive a furcation tube having reinforcing fibers, and each furcation tube is of a size sufficient to receive one of the plurality of conductors of the cable. The furcation tube reinforcing fibers approach the furcation spacer from the second end and are anchored adjacent the first end, and the cable reinforcing fibers approach the furcation spacer from the first end and are anchored adjacent the second end, such that tensioning the furcation tube reinforcing fibers and cable reinforcing fibers places the furcation spacer under compressive stress.

21 Claims, 10 Drawing Sheets

FURCATION APPARATUS FOR OPTICAL FIBERS

BACKGROUND OF THE INVENTION

The present invention relates to a furcation apparatus for conductors of a multi-conductor ribbon or cable. More specifically, the present invention describes a furcation apparatus for use with ruggedized fanout or furcation assemblies which use strength members such as aramid fiber reinforcements for longitudinal strength.

The present invention is described herein in relation to optical fibers of multi-fiber ribbons or cables. However, it is contemplated that the invention is equally applicable and useful for conductor types other than optical fibers. For example, the furcation apparatus described herein may be used with electrical conductors such as micro-coaxial conductors which are part of a multi-conductor cable. Therefore, references herein to optical fibers and optical fiber cables are also intended to include electrical conductors and their associated cables.

The use of fiber optic cables in applications such as telecommunication networks, cable TV networks, and data communication networks is well known. The advantages of using fiber optic systems include a broader bandwidth for signal transmission and inherent immunity to electro magnetic interference. Because of these advantages, the use of fiber optic cables is becoming more and more common. Therefore, it becomes increasingly important to have components for use with fiber optic cables which are easy to use and manufacture.

The appearance of fiber optic cables generally resembles that of electrical cables. Fiber optic cables typically comprise optical fibers and other cable elements which are protected from the external environment by an external jacket. Typically, a strength member such as an aramid fiber is placed within the outer jacket for additional longitudinal strength in the cable. Alternately, the cables may be of a loosely bundled type with the optical fibers contained loosely within the tubes or ducts in a cable core. Again, a strength element such as an aramid fiber may also be included.

To make connections to individual optical fibers, the individual optical fibers must be separated from each other for connectorization. Typically, each of the individually exposed fibers is protected by what is known in the art as a furcation tube or fanout tube. Typical furcation tubes consist of an inner tube for receiving the optical fiber. The inner tube is surrounded by a strength member such as an aramid fiber and an outer jacket to provide environmental protection. It is both necessary and desirable to protect each of the optical fibers when transitioning from the multi-fiber cable to the individual furcation tubing. Thus, to make the installation of fiber cables reliable and efficient a furcation unit is needed which allows individual optical fibers to be easily handled, connectorized and spliced. The furcation unit must protect the fibers in the transition region between the multi-fiber cable and the furcation tubes.

Furcation kits sometimes do not adequately protect or secure different members of the furcation, or are very difficult to assemble. In addition, some furcation kits require the use of tools or encapsulants which complicate their use. Methods and devices for furcation which do not require specialized tools or encapsulants offer distinct advantages when assembling the fiber optic cables. In addition, having a furcation unit which is compact in size (both in cross section and length) would be advantageous, as the use of fiber optic cables is increasingly common in areas of limited space. Additionally, it would desirable if the furcation unit minimized bending of the individual optical fibers, as bending may adversely affect the performance of the optical fibers.

SUMMARY OF THE INVENTION

The inventive furcation apparatus described herein provides an easily used and assembled apparatus for separating and protecting individual conductors of a multi-conductor cable such an optical fiber cable or and electrical cable with multiple conductors. The furcation apparatus does not require the use of encapsulants or specialized tools. In addition, the furcation apparatus described herein is compact in size, both in cross-section and length, thereby permitting the use of the furcation apparatus in areas of limited space.

In a preferred embodiment, the furcation apparatus includes a furcation spacer having a first end and a second end, with a plurality of passages extend through an interior of the furcation spacer from the first end to the second end. Each passage is adapted to receive an individual furcation tube of the type having reinforcing fibers. Each of the plurality of passages has a corresponding channel on an exterior surface of the furcation spacer. The channels are of a size sufficient to receive the reinforcing fibers of the furcation tubes. An index ring is positioned around the circumference of the furcation spacer and covers a portion of each of the channels in the furcation spacer. The index ring has a gap extending there through which is in parallel alignment with the channels to allow placement of the furcation tube reinforcing fibers. The index ring may then be rotated to lock the reinforcing fibers in place. The gap in the index ring may be selectively aligned with one of the plurality of channels. A clamping ring is adapted to engage with the second end of the furcation spacer, and a guard member is adapted to engage with the first end of the furcation spacer. The guard member is also configured to receive a multi-fiber optical cable of the type having reinforcing fibers. A crimping ring is provided to crimp the reinforcing fibers of the multi-fiber optical cable securely to the guard member.

The furcation apparatus is configured such that when the reinforcing fibers of the furcation tubes and the reinforcing fibers of the cable are placed under tension, the furcation spacer is placed under compressive stress. That is, the tension in the reinforcing fibers of the furcation tubes and cable is transformed into compression in the furcation spacer. Because the furcation spacer is preferably formed of a polymeric material and such materials are inherently stronger in compression than in tension, placing the furcation spacer in a state of compression reduces the likelihood that the furcation spacer may fracture in use. This greatly increases the mechanical reliability of the furcation apparatus.

DETAILED DESCRIPTION OF THE INVENTION

Figure 1A:
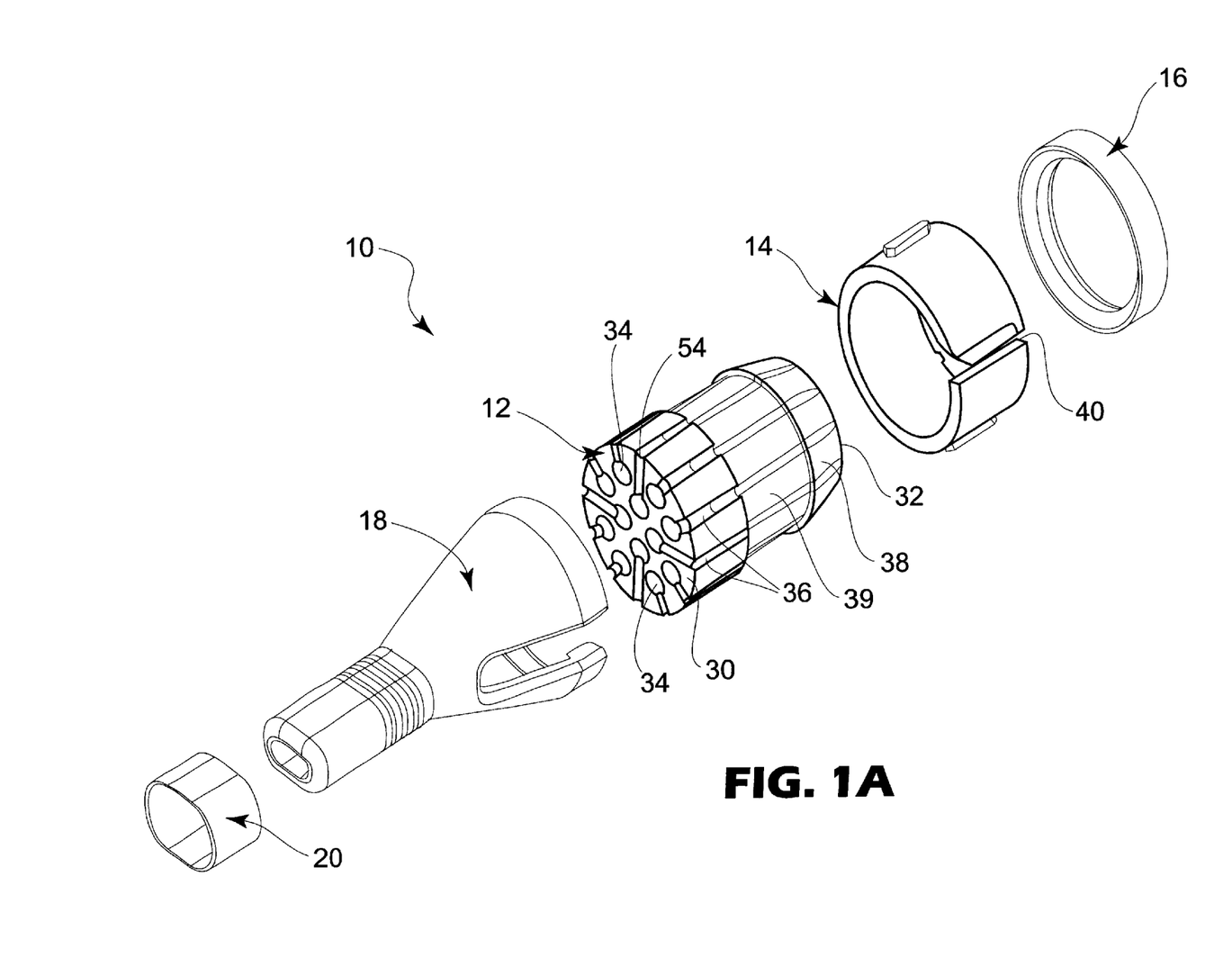
FIG. 1A is an exploded perspective view of the inventive furcation apparatus.
Figure 1B:
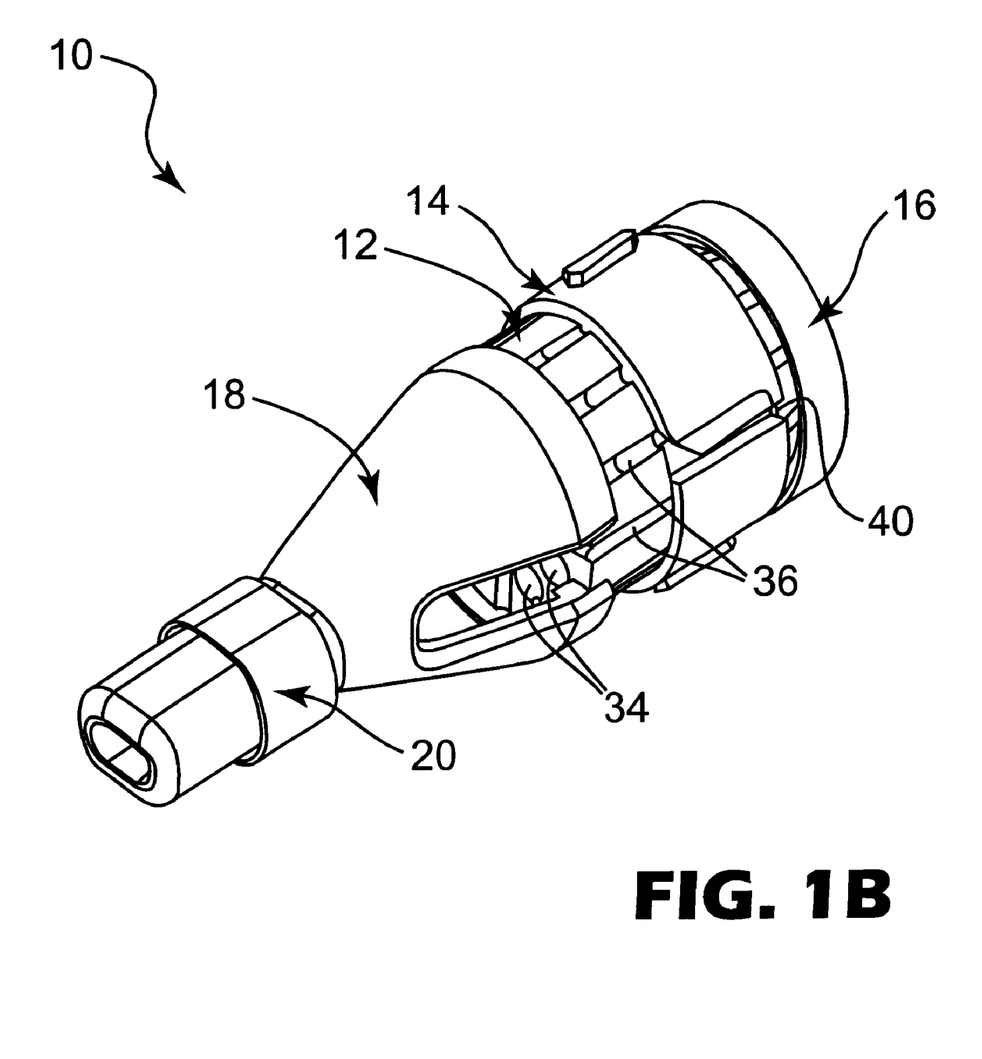
FIG. 1B is a perspective view of the furcation apparatus of FIG. 1 in an assembled condition.

FIG. 1A shows an exploded view of a furcation apparatus 10 for use with a multi-conductor cable (such as a multi-fiber optical cable or a multi-conductor electrical cable) and individual furcation tubes. FIG. 1B shows an assembled furcation apparatus 10 without any conductors or furcation tubes. The furcation apparatus 10 includes a furcation spacer 12, an index ring 14, a clamping ring 16, a transition region guard member 18, and a crimping ring 20.

For purposes of clarity, furcation apparatus 10 is described below only in reference to multi-fiber optical cables. However, the discussion is equally applicable to multi-conductor cables in which the conductor is electrical, rather than optical in nature.

As described in greater detail below, the furcation spacer 12 is used for mounting the furcation tubes and routing and anchoring the reinforcing strength members (typically aramid filaments or fibers, such as Kevlar™) from both the furcation tubes and the multi-fiber optical cable. The furcation spacer 12 is preferably generally cylindrical in shape and has a first end 30 and a second end 32. A plurality of passages 34 extend through the interior of the furcation spacer 12 from the first end 30 to the second end 32. Each of the passages 34 is adapted to receive an individual furcation tube. A plurality of channels 36 are formed on the exterior surface 38 of the furcation spacer 12, with a channel 36 provided for each of the plurality of passages 34. The channels 36 are of a size to receive the reinforcing aramid fibers of the furcation tubes.

The index ring (retaining ring) 14 is used to both organize and secure the aramid reinforcing filaments of the furcation tubes onto the channels 36 of the furcation spacer 12. The index ring 14 surrounds the furcation spacer 12 and rotates about the exterior surface 38 of the furcation spacer 12. Preferably, a band 39 is formed about the circumference of furcation spacer 12 for holding index ring 14 in position on furcation spacer 12. The index ring 14 covers at least a portion of each of the channels 36, and has a gap or opening 40 which may be selectively aligned with any of the plurality of channels 36 such that the reinforcing filaments may be easily guided into the desired one of channels 36. When opening 40 in index ring 14 is not aligned with a channel 36, the reinforcing filaments which are in channels 36 are secured against furcation spacer 12 by index ring 14.

Guard member 18 is used to protect the optical fibers in the transition region where the optical fibers are bent to enter the furcation spacer and furcation tubes. Guard member 18 prevents uncontrolled or inadvertent micro and macro bending of the optical fibers which may adversely affect the optical fiber performance. In a preferred embodiment, guard member 18 and furcation spacer 12 engage in such a manner as to prevent relative rotation of those elements. For example, relative rotation between guard member 18 and furcation spacer 12 may be prevented by providing a key member on guard member 18 which interlocks with furcation spacer 12.

Crimping ring is used to crimp the aramid filaments from the multi-fiber optical cable, and to also crimp the optical cable jacket securely inside the guard member 18.

Those skilled in the art will recognize that the furcation apparatus described herein may be made any size which is appropriate for the cable and fibers being used. It is anticipated that the dimensions of the furcation apparatus may vary widely depending upon its intended use, and the figures provided herein are illustrative only. However, in a preferred embodiment for use with the more commonly used optical cables, the size of the furcation spacer 12 is in the range of about 0.7 to 1.0 inches long with a diameter in the range of about 0.3 to 0.5 inches. The channels 36 are in the range of about 0.03 to 0.05 inches wide, with a depth in the range of about 0.10 to 0.15 inches. The index ring 14 is sized appropriately to match the diameter of the furcation spacer 12, with the width of the index ring 14 in the range of about 0.2 to 0.5 inches.

Figure 2:
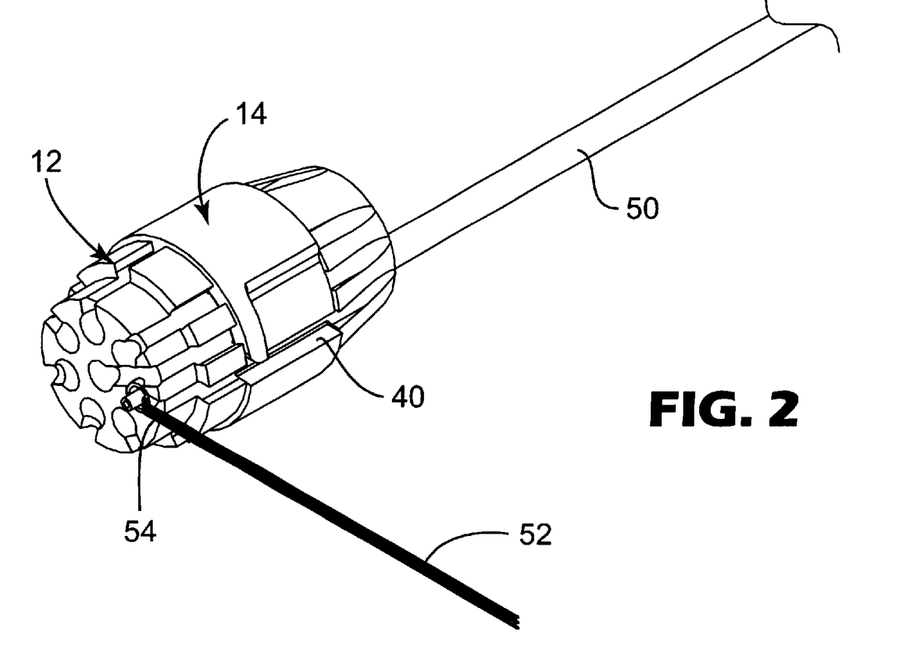
FIGS. 2–7 illustrate the attachment of a furcation tube to the furcation apparatus.
Figure 3:
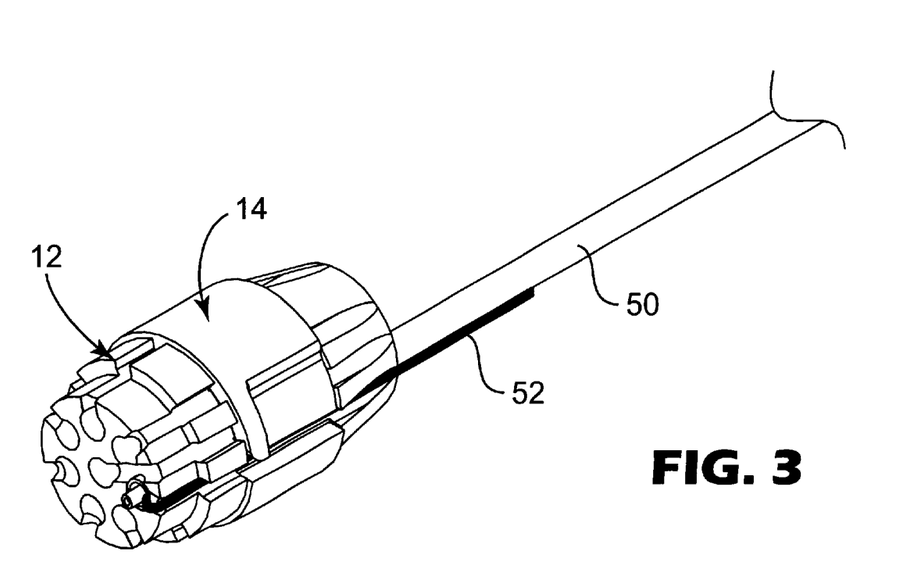
Figure 4:
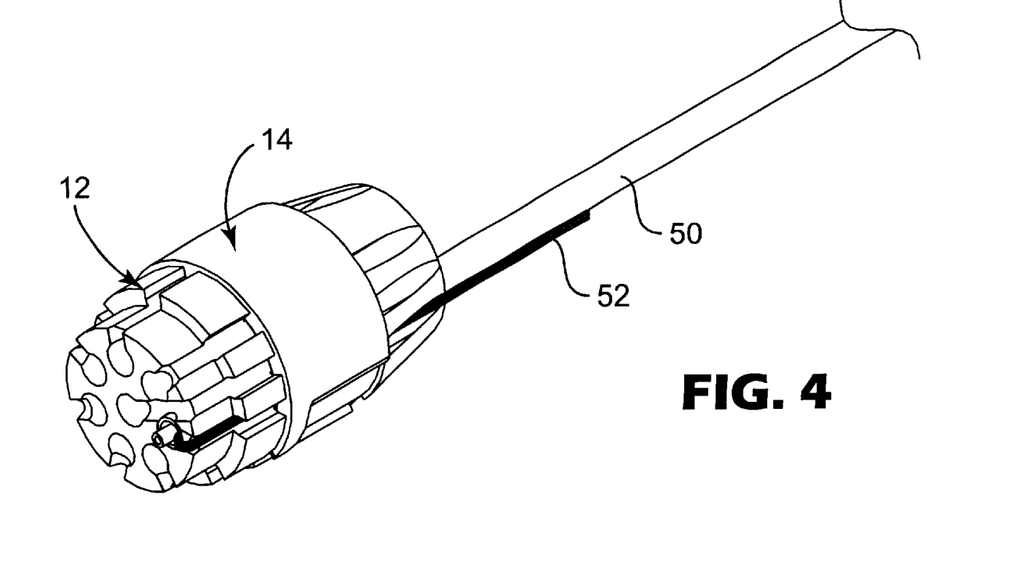
Figure 5:
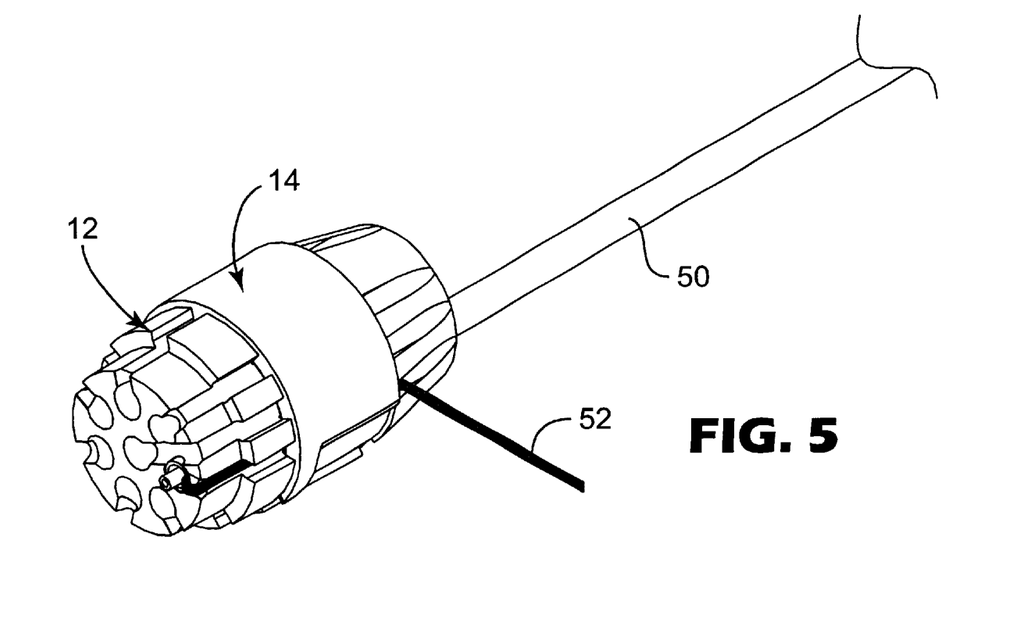
Figure 6:
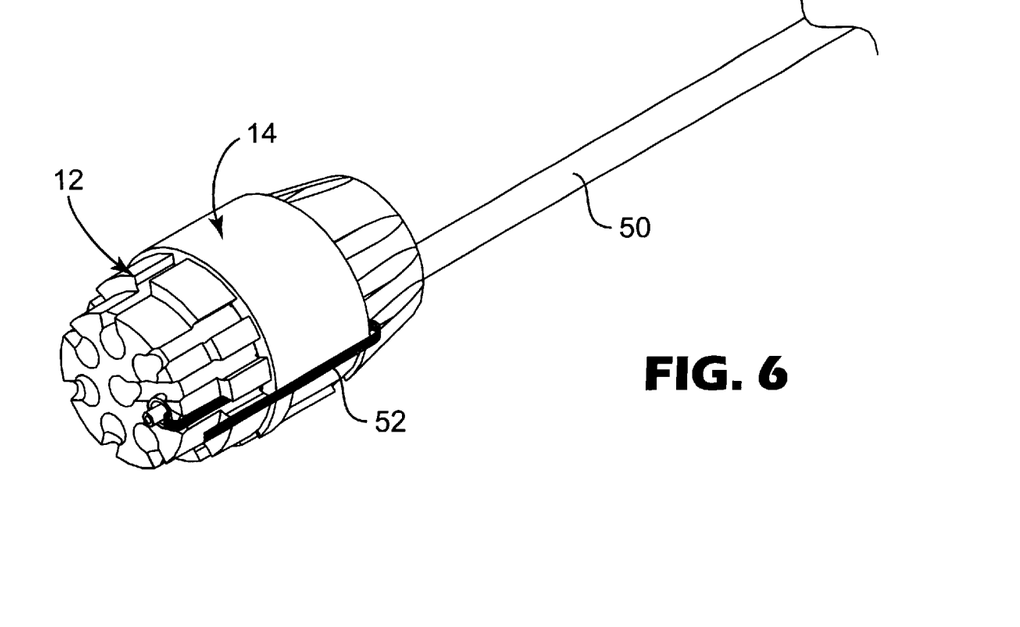

The furcation apparatus 10 is used and assembled as shown in FIGS. 2–15, and as described in greater detail below. In use, furcation tubes 50 are inserted into the second end 32 of the furcation spacer 12, and the furcation tube 50 is cut to expose the reinforcing filaments 52 within the tube 50. As shown in FIG. 2, the gap 40 of index ring 14 is aligned with the channel 36 corresponding to the passage 34 in which the furcation tube 50 is inserted, and the reinforcing filaments 52 are pulled and bent over the edge 54 of the furcation spacer 12. As shown in FIG. 3, as reinforcing filaments 52 are further bent around the edge 54 of the furcation spacer 12, the reinforcing filaments 52 are guided through the gap 40 in the index ring 14 and enter the channel 36 in the furcation spacer 12. The index ring 14 may then be rotated to secure the reinforcing filaments 52 in the channel 36 on the furcation spacer 12, as shown in FIG. 4. In this manner, reinforcing filaments 52 are anchored adjacent first end 30 of furcation spacer 12, such that tension on reinforcing filaments 52 causes a resultant force against first end 30 in the direction of second end 32. Preferably, as shown in FIGS. 5–6, because reinforcing filaments 52 are often formed of a relatively slippery material, reinforcing filaments 52 are also bent back over the index ring 14 to reduce the possibility of reinforcing filaments 52 slipping between index ring 14 and furcation spacer 12. As an additional securing measure, reinforcing filaments could be secured by crimping ring 20.

Figure 7:
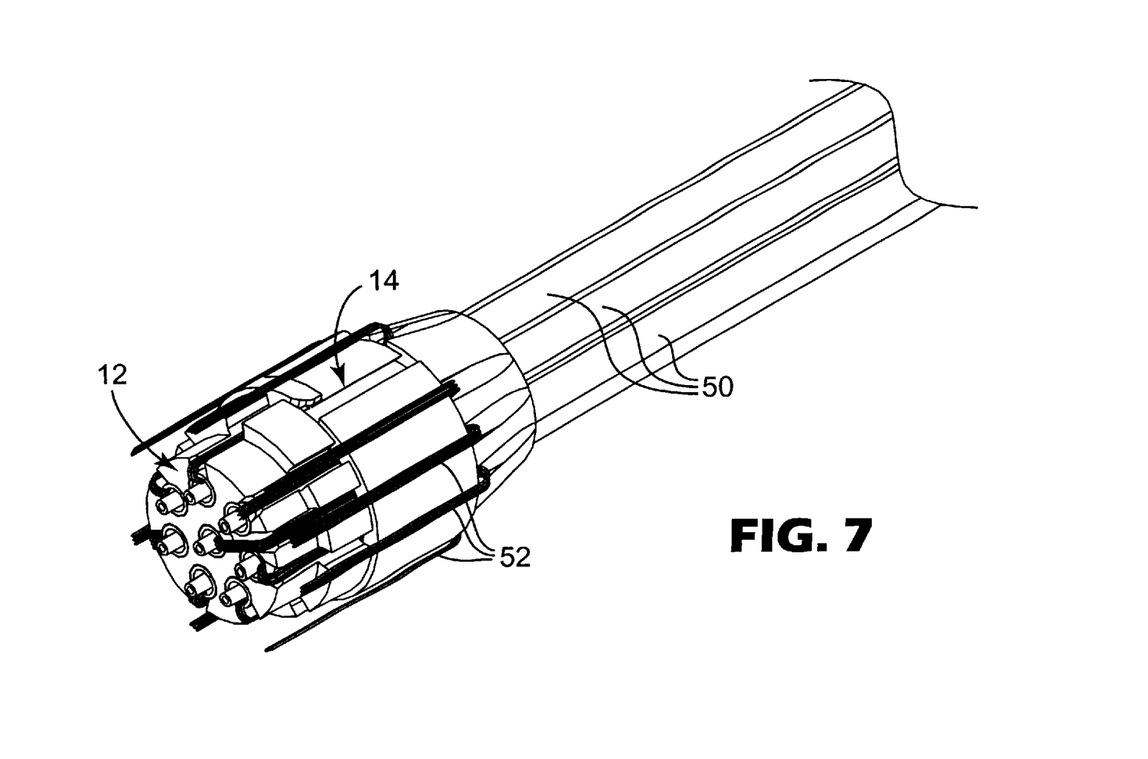

The above-described process for installing furcation tube 50 is repeated for each individual furcation tube 50 and its associated reinforcement filaments 52, until each of the furcation tubes 50 and reinforcing filaments 52 are secured in the furcation spacer 12 by the index ring 14, as shown in FIG. 7.

Figure 8:
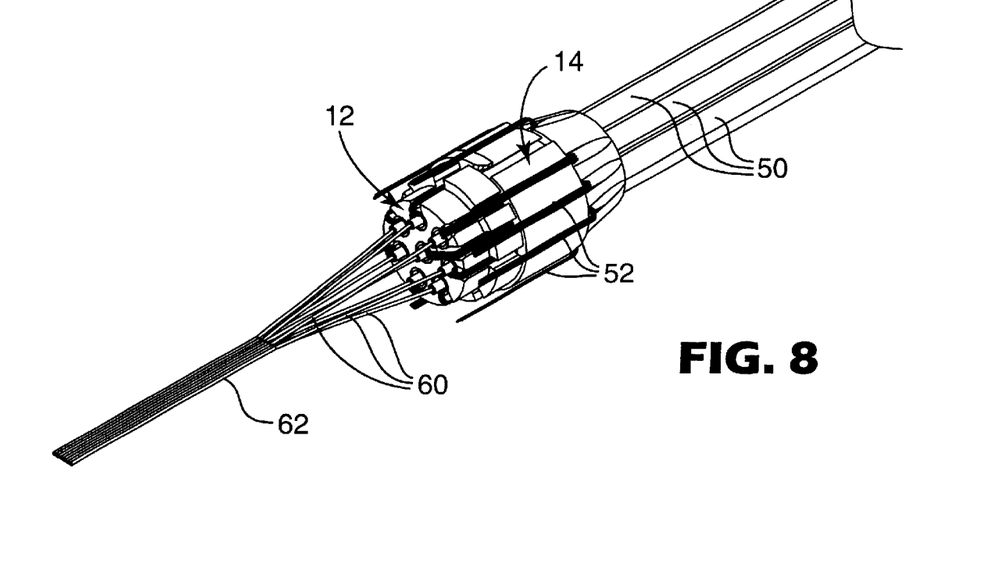
FIG. 8 illustrates the insertion of individual optical fibers into the furcation tubes.

After furcation tubes 50 are secured to the furcation spacer 12, the individual optical fibers 60 from the multi-fiber optic cable 62 must be fed into the proper furcation tubes 50, as seen in FIG. 8.

Figure 9A:
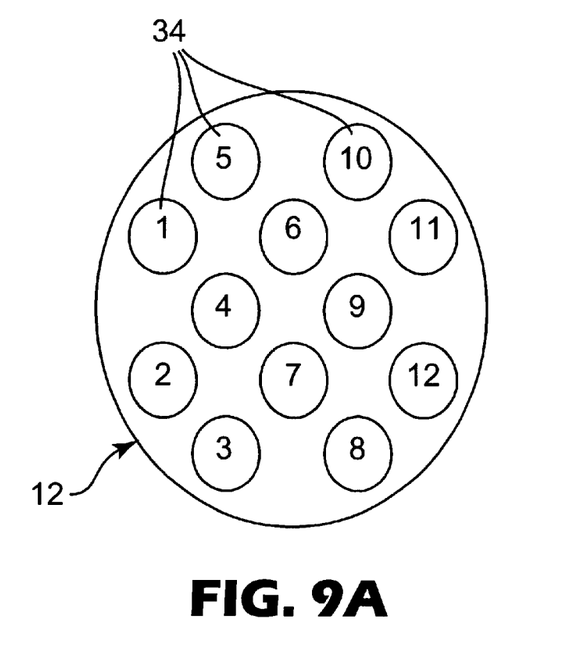
FIGS. 9A and 9B illustrate a preferred arrangement of furcation tubes within the furcation apparatus for a 12 conductor cable.
Figure 9B:
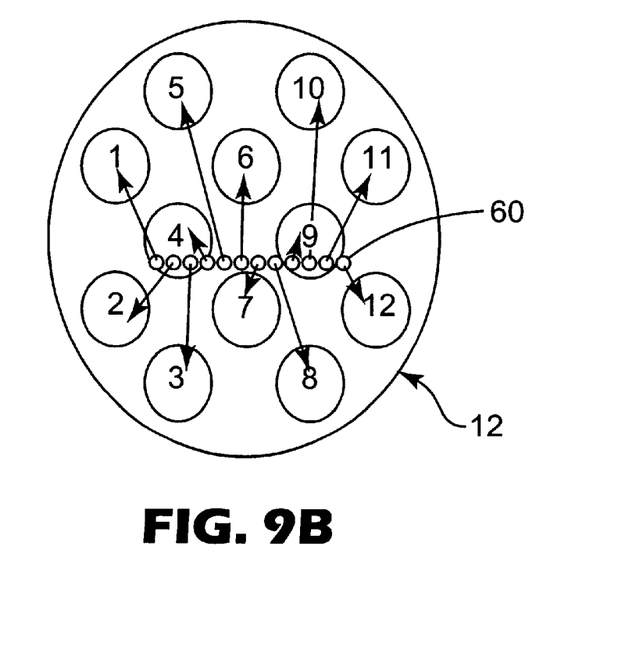

Although not required, the passages 34 in furcation spacer 12 are preferably arranged so as to minimize any bending or crisscrossing of the individual optical fibers 60 as they are routed from the multi-fiber optical cable into the furcation apparatus 10. A preferred arrangement of passages 34 for use with a twelve fiber optical ribbon cable is shown in FIGS. 9A and 9B. The individual optical fibers 60 are preferably inserted into passages 34 in the order in which passages 34 are numbered in FIG. 9A. In this manner, as seen in FIG. 9B, crisscrossing of the individual optical fibers 60 is avoided. In addition, the circular cross-section of the furcation spacer 12 minimized the "footprint" of the device, and therefore also minimizes the degree of bending required of the optical fibers 60 as they transition from the cable into furcation spacer 12. Of course, those skilled in the art will readily recognize that a plurality of different arrangements of passages 34 may be used. Those skilled in the art will also recognize that a similar arrangement of passages 34 and insertion order of optical fibers 60 may be used with any number of optical fibers 60, including the commonly used cables having 4, 8 and 12 fibers.

Figure 10:
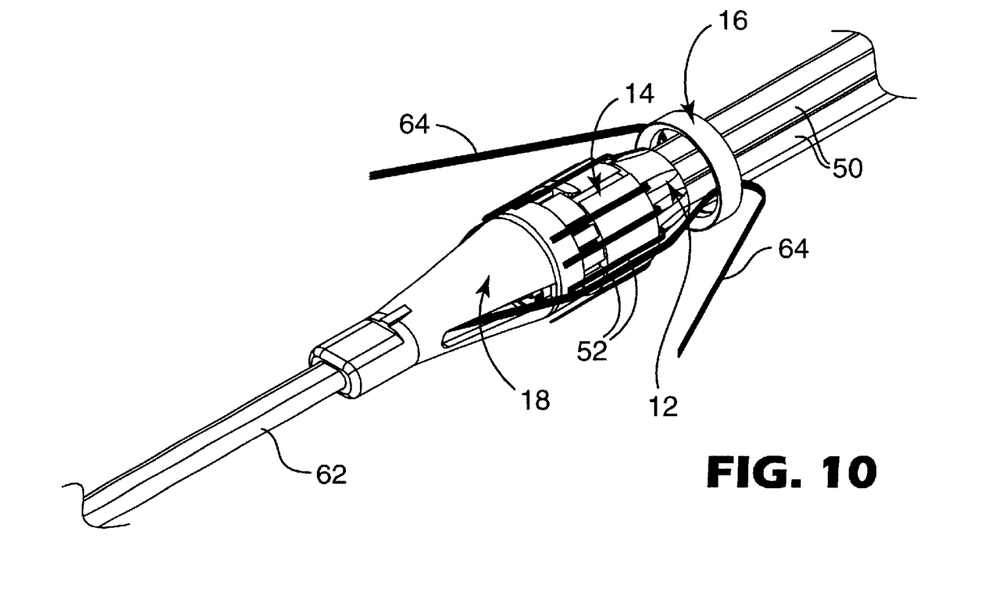
FIGS. 10–14 illustrate the attachment of a multi-fiber optical cable to the furcation apparatus.
Figure 11:
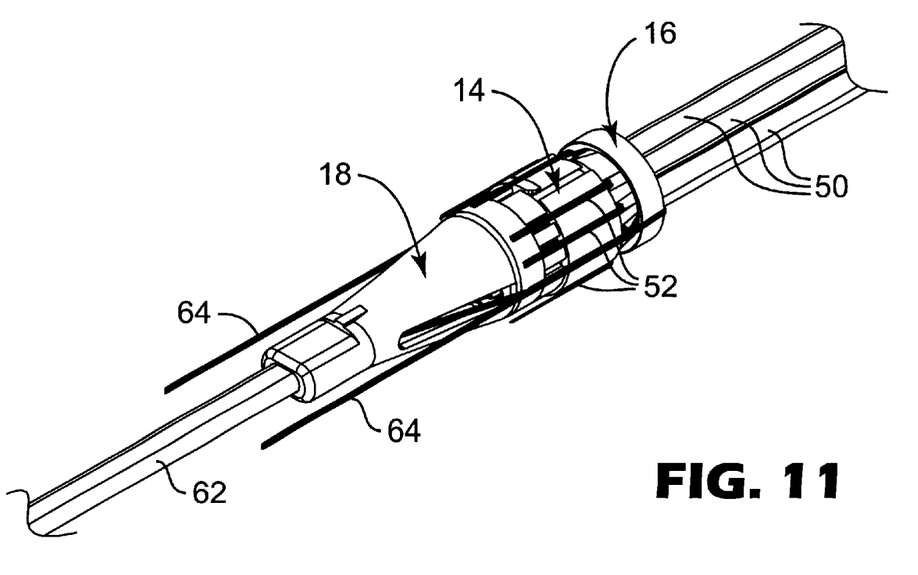

After the individual optical fibers 60 are placed in their respective furcation tubes 50, the reinforcing filaments 64 from the fiber optic cable 62 are pulled through the open slots 66 in both sides of the transition region guard member 18. The cable reinforcing filaments 64 are then threaded through the clamping ring 16 and folded back, as shown in FIGS. 10–11.

Next, the reinforcing filaments 64 of the fiber optic cable 62 are cinched over clamping ring 16, thereby drawing clamping ring 16 tightly against furcation spacer 12 and anchoring the reinforcing filaments 64 against furcation spacer 12 adjacent its second end 32. Preferably, clamping ring 16 and furcation spacer 12 have a wedging engagement. As reinforcing filaments 64 of fiber optic cable 62 are cinched, fiber optic cable 62 will be seated in the proper position within the guard member 18. It can now be seen that tension on cable reinforcing filaments 64 causes a resultant force against second end 32 in the direction of first end 30.

Figure 12:
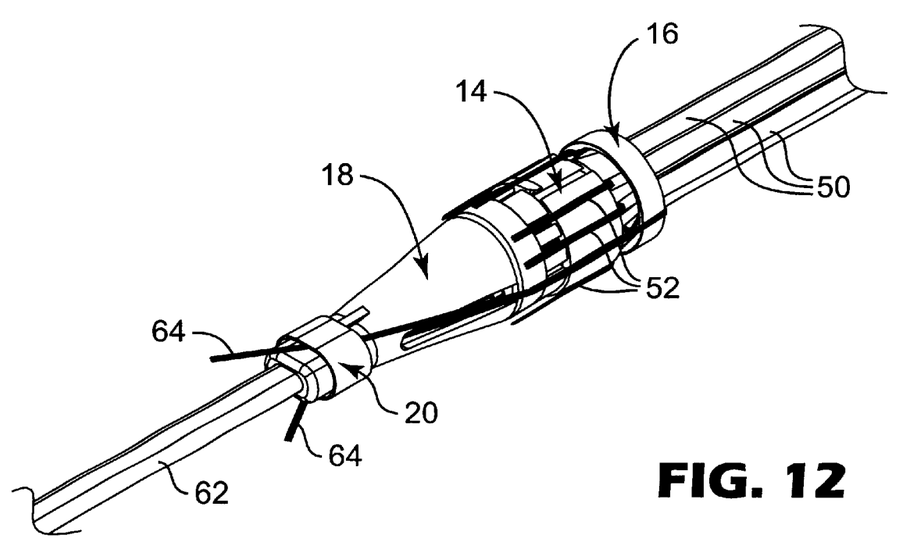
Figure 13:
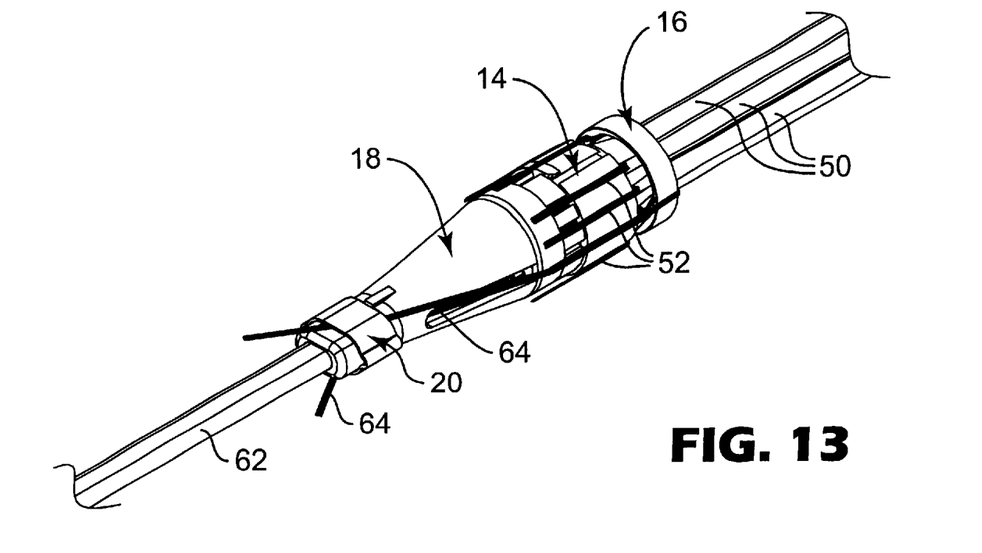
Figure 14:
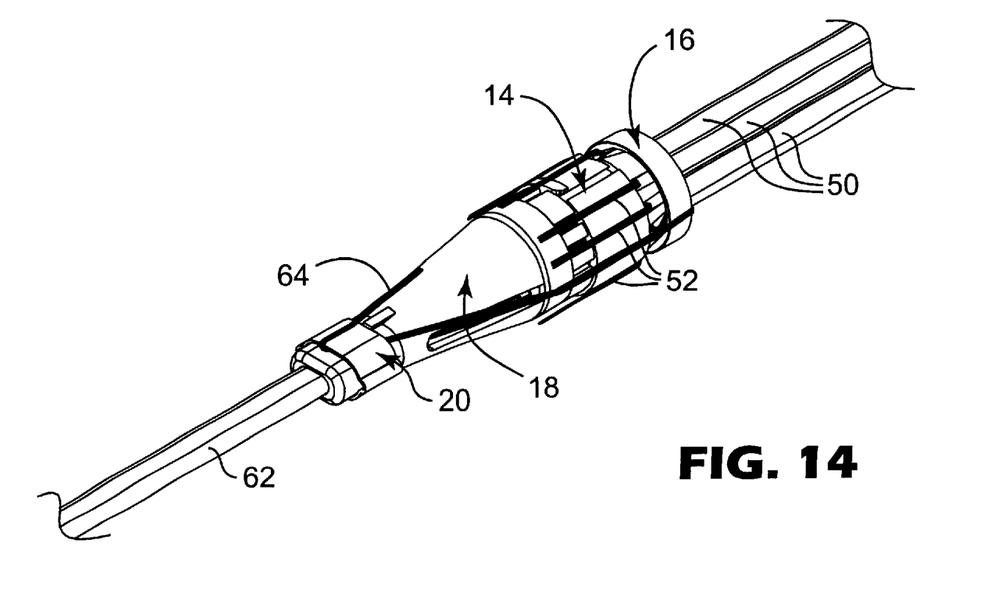
Figure 15:
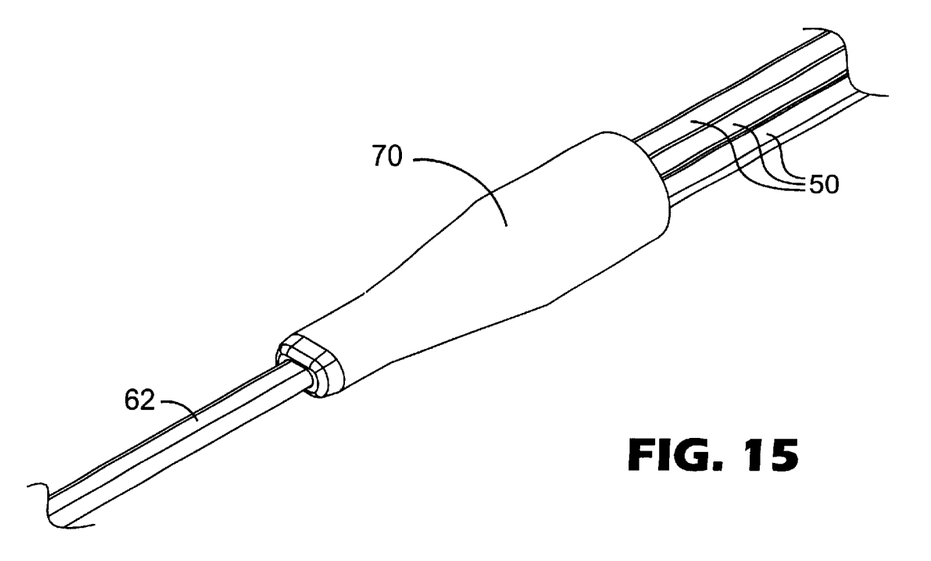
FIG. 15 is a perspective view of the assembled furcation unit, furcation tubes and multi-fiber optical cable enclosed in a protective member.
Figure 16:
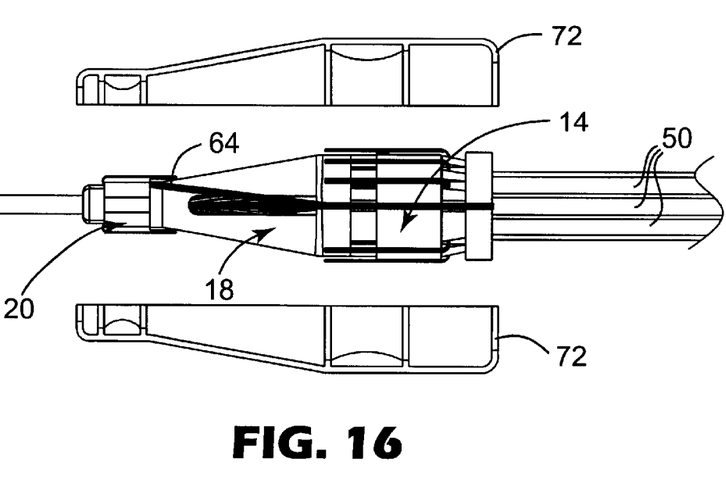
FIG. 16 is a partial cross-sectional view of an alternate embodiment of the protective member.

Preferably, the reinforcing filaments 64 of the fiber optic cable 62 are pulled under crimping ring 20 as shown in FIG. 12. The crimping ring 20 is crimped to hold the reinforcing filaments 64 in place (FIG. 13) and prevent them from slipping. Optionally, as mentioned above, reinforcing filaments 52 may also be crimped beneath crimping ring 20. Preferably, as shown in FIGS. 14 and 15, the filaments 64 (and optionally filaments 52) are again folded back toward the index ring 14, and a protective member 70 is placed over the furcation apparatus 10. The protection member 70 may be, for example, a heat shrinkable tube or a cold shrinkable tube as shown in FIG. 15, or a molded shell as shown in FIG. 16. If protection member 70 is a heat shrinkable or cold shrinkable tube, it is preferable to have a furcation apparatus which is cylindrical in shape, because a cylindrical shape allows a more uniform bond with heat shrinkable or cold shrinkable tubing over the completed furcation and transition area.

Although the components of furcation apparatus 10 may be made of any suitable material, components except for crimping ring 20 are preferably made from a wide variety of standard engineering polymer resins such as, for example, polycarbonate (PC), polyvinyl chloride (PVC) or polyetherimide (PEI). While the use of such polymeric materials provides numerous advantages, such as low cost, ease of manufacturability and low weight, there are also associated disadvantages. The primary disadvantage is that polymeric materials are inherently weaker in tension than in compression. One function of furcation apparatus 10 is to effectively link or splice the reinforcing filaments 64 of the multi-conductor cable 62 with the reinforcing filaments 52 of the furcation tubes 50 to maintain the tensile strength reinforcement around the optical fibers 60. As described above, reinforcing filaments 52, 64 are anchored to furcation spacer 12 such that tension on reinforcing filaments 52 causes a resultant force against first end 30 in the direction of second end 32 and tension on cable reinforcing filaments 64 causes a resultant force against second end 32 in the direction of first end 30. Thus, simultaneously tensioning reinforcing filaments 52, 64 will result in a compressive force within furcation spacer 12, thereby greatly reducing the possibility of furcation spacer 12 fracturing.

The advantages of the above described furcation apparatus 10 are numerous. The furcation apparatus 10 assists in organizing the reinforcing filaments 52, 64 in channels 36. The furcation apparatus 10 protects the individual optical fibers 60 from micro and macro bending which may decrease the performance of the optical fibers. The furcation apparatus 10 also creates a compressive stress in furcation spacer 12 to lessen the possibility of fracture. The invention thereby provides a compact and less bulky furcation apparatus which is both more aesthetically appealing and more mechanically reliable.

What is claimed is:

1. A furcation apparatus for optical fibers, the apparatus comprising:

a furcation spacer having a first end and a second end, wherein a plurality of passages extend through an interior of the furcation spacer from the first end to the second end, and each of the plurality of passages has a corresponding channel on an exterior surface of the furcation spacer, wherein each passage is adapted to receive a furcation tube having reinforcing fibers;

an index ring surrounding the furcation spacer and covering a portion of each of the channels in the furcation spacer, the index ring having a gap extending there through in parallel alignment with the channels, the index ring rotates about the furcation spacer a clamping ring adapted to engage the second end of the furcation spacer;

a guard member having a first end for receiving a multi-fiber optical cable and a second end for mating with the first end of the furcation spacer; and a crimping ring for crimping on the first end of the guard member.

2. The furcation apparatus of claim 1, wherein the furcation spacer is cylindrical in shape.

3. The furcation apparatus of claim 1, wherein the guard member is conical in shape.

4. The furcation apparatus of claim 1, wherein the guard member is in interlocking engagement with the furcation spacer to prevent relative rotation between the guard member and the furcation spacer.

5. The furcation apparatus of claim 1, wherein the clamping ring engages the second end of the furcation spacer in a wedging manner.

6. The furcation apparatus of claim 1, wherein the length of the furcation spacer is less than one inch.

7. The furcation apparatus of claim 1, wherein the furcation spacer has a diameter of less than 0.5 inches.

8. The furcation apparatus of claim 1, wherein the furcation spacer has 12 passages.

9. The furcation apparatus of claim 1, wherein the furcation spacer has 8 passages.

10. The furcation apparatus of claim 1, wherein the furcation spacer has 4 passages.

11. The furcation apparatus of claim 1, wherein the furcation spacer is made of a polymeric material.

12. A furcation apparatus for a cable of the type having a plurality of conductors and reinforcing fibers for longitudinal strength, the apparatus comprising:

a furcation spacer having a first end and a second end; and a plurality of passages extending through an interior of the furcation spacer from the first end to the second end, wherein each passage is of a size sufficient to receive a furcation tube having reinforcing fibers, and wherein each furcation tube is of a size sufficient to receive one of the plurality of conductors of the cable;

wherein the furcation tube reinforcing fibers approach the furcation spacer from the second end and are anchored adjacent the first end, and the cable reinforcing fibers approach the furcation spacer from the first end and are anchored adjacent the second end, such that tensioning the furcation tube reinforcing fibers and cable reinforcing fibers places the furcation spacer under compressive stress.

13. The furcation apparatus of claim 12, wherein the cable reinforcing fibers are anchored adjacent the second end by a clamping ring.

14. The furcation apparatus of claim 13, wherein the clamping ring engages the second end of the furcation spacer in a wedging manner.

15. The furcation apparatus of claim 14, wherein the cable reinforcing fibers are clamped between the clamping ring and the furcation spacer.

16. The furcation apparatus of claim 12, wherein each of the plurality of passages has a corresponding channel on an exterior surface of the furcation spacer for receiving the furcation tube reinforcing fibers.

17. The furcation apparatus of claim 16, wherein a retaining ring secures the furcation tube reinforcing fibers within the channels.

18. The furcation apparatus of claim 17, wherein the retaining ring is an index ring having a gap extending therethrough, the gap in parallel alignment with the channels for allowing passage of the furcation tube reinforcing fibers into one of the plurality of channels.

19. The furcation apparatus of claim 12, wherein the conductors are optical fibers.

20. The furcation apparatus of claim 12, wherein the conductors are electrical conductors.

21. A method of furcating individual conductors of a multi-conductor cable, the cable of the type having reinforcing fibers for longitudinal strength, the method comprising:

providing a furcation spacer having a first end and a second end, the furcation spacer having a plurality of passages extending through an interior of the furcation spacer from the first end to the second end, wherein each passage is of a size sufficient to receive a furcation tube having reinforcing fibers, and wherein each furcation tube is of a size sufficient to receive one of the plurality of conductors of the cable;

guiding the furcation tube reinforcing fibers from the second end of the furcation spacer through the passages to the first end of the furcation spacer;

anchoring the furcation tube reinforcing fibers adjacent the first end of the furcation spacer;

guiding the cable reinforcing fibers from the first end of the furcation spacer to the second end of the furcation spacer;

anchoring the cable reinforcing fibers adjacent the second end of the furcation spacer;

wherein tensioning the furcation tube reinforcing fibers and cable reinforcing fibers compresses the furcation spacer.

\* \* \* \* \*